(12) United States Patent
Donthamsetty et al.

(10) Patent No.: US 8,363,666 B2
(45) Date of Patent: Jan. 29, 2013

(54) MULTIPLE NETWORK ARCHITECTURE PROVIDING FOR MIGRATION OF DEVICES

(75) Inventors: Siva Prasad Donthamsetty, Bangalore (IN); Kulkarni Hrishikesh Vishwas, Bangalore (IN); Lilian Sylvia Fernandes, Bangalore (IN); Michael R. Smith, San Jose, CA (US); Srinath Mohanraj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 12/754,609

(22) Filed: Apr. 6, 2010

(65) Prior Publication Data

US 2011/0206047 A1   Aug. 25, 2011

(30) Foreign Application Priority Data

Feb. 22, 2010 (IN) .............................. 383/DEL/2010

(51) Int. Cl.
*H04L 12/28* (2006.01)

(52) U.S. Cl. ........ 370/401; 370/392; 370/445; 370/465; 709/226

(58) Field of Classification Search ........................ None
See application file for complete search history.

(56) References Cited

U.S. PATENT DOCUMENTS

| | | | | |
|---|---|---|---|---|
| 6,639,901 | B1 * | 10/2003 | Katzri et al. .................. | 370/255 |
| 7,174,390 | B2 * | 2/2007 | Schulter et al. ............... | 709/245 |
| 7,486,611 | B1 | 2/2009 | Wilson | |
| 7,649,851 | B2 * | 1/2010 | Takashige et al. ............ | 370/254 |
| 7,733,807 | B2 * | 6/2010 | Takefman ...................... | 370/255 |
| 7,808,994 | B1 * | 10/2010 | Vinokour et al. ............. | 370/392 |
| 8,094,666 | B2 * | 1/2012 | Cagenius ....................... | 370/401 |
| 8,160,063 | B2 * | 4/2012 | Maltz et al. ................... | 370/389 |
| 8,166,187 | B2 * | 4/2012 | Gowda et al. ................. | 709/230 |
| 2006/0215594 | A1 | 9/2006 | Shirokura et al. | |
| 2009/0300605 | A1 * | 12/2009 | Edwards et al. ................... | 718/1 |
| 2010/0110975 | A1 * | 5/2010 | Cagenius ....................... | 370/328 |
| 2010/0189117 | A1 * | 7/2010 | Gowda et al. ................. | 370/401 |
| 2010/0257269 | A1 * | 10/2010 | Clark ............................ | 709/226 |
| 2011/0075664 | A1 * | 3/2011 | Lambeth et al. .............. | 370/390 |
| 2011/0116509 | A1 | 5/2011 | Moreno et al. | |

OTHER PUBLICATIONS

Gerd Pflueger, "Data Center Interconnect mit Layer 2—Solutions Overview," Cisco Systems, Inc., San Jose, CA, Sep. 17, 2009 (46 pages).
"ProCurve Series 8200zl Switches, Advanced Traffic Management Guide," Ver. K.12.xx, Hewlett-Packard Development Company, Publication No. 5991-8584, Sep. 2007 (268 pages).

* cited by examiner

*Primary Examiner* — Michael J Moore, Jr.
(74) *Attorney, Agent, or Firm* — The Law Office of Kirk D. Williams (57) ABSTRACT

In providing seamless migration of virtual or physical devices among networks of a virtual local area network (VLAN) such as one spanning multiple data centers, a same virtual anycast Medium Access Control (VMAC) is used for reaching default gateways in virtual and/or physical devices. Each network is typically configured such that source MAC learning for the VMAC should happen only for packets coming from the local default gateway. In this manner, when a device is migrated between networks of the VLAN, the same IP address and corresponding MAC address (typically still residing in the MAC cache of the migrated device) can be used to reach the local default gateway.

21 Claims, 6 Drawing Sheets

MULTIPLE NETWORK ARCHITECTURE PROVIDING FOR MIGRATION OF DEVICES

TECHNICAL FIELD

The present disclosure relates generally to network architectures for communicating information, such as, but not limited to, a virtual local area network (VLAN) spanning multiple networks (e.g., of different data centers) and allowing migration of virtual or physical devices among the networks.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Additionally, data centers are implementing virtual devices for customers. A physical device may implement multiple virtual devices (e.g., on top of a hypervisor), with each virtual device looking like a single, physical device to a user. Should a physical device become overloaded, a virtual device can essentially be placed in a preserved state, migrated to another physical device, and then continue its operation from the preserved state.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with multiple network architecture providing for migration of devices. One embodiment includes a virtual local area network (VLAN), comprising: a first network including a first gateway router assigned a first Internet Protocol (IP) address and first Medium Access Control (MAC) address for use including forwarding packets received from one or more external networks into the first network; and a second network, communicatively coupled with the first network for exchanging Layer 2 traffic, and including a second gateway router assigned a second IP address and second MAC address for use including forwarding packets received from said one or more external networks into the second network. Each of the first and second gateway routers are further assigned a same third IP address and a same third MAC address for use in selectively communicating with devices on their respective first or second network, such that a virtual or physical device migrated from the first network to the second network can use the third IP address as its default IP gateway address and reach the default gateway using packets addressed with a MAC destination address of the third MAC address when it is on the first network and when it is on the second network. The VLAN is configured such that Layer 2 traffic devices in the first network will MAC learn ports for the third MAC that are towards the first gateway router and not towards the second gateway router, and configured such that Layer 2 traffic devices in the second network will MAC learn ports for the third MAC that are towards the second gateway router and not towards the first gateway router.

In one embodiment, packet traffic, addressed with the third MAC address as its source MAC address, originated on the first network or the second network will not be communicated to the other said second or first network. One embodiment thus allows a physical or virtual machine, having its default IP gateway as the third IP address reachable via the third MAC address, to be migrated between networks and continue its operation as packet traffic to the external networks will be forwarded by the gateway router on the device's current network.

2. Description

Disclosed are, inter alia, methods, apparatus, computer-storage media, mechanisms, and means associated with an externally managed security and validation processing device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Modern data center deployments typically span multiple sites (e.g., each with its own "network" which is typically part of a larger network spanning the multiple sites), but use a single large Layer 2 (L2) domain interconnecting them into a single virtual local area network (VLAN). L2 connectivity between the sites is typically provided using a Data Center Interconnect (DCI) technology, such as, but not limited to VPLS/VPLSoGRE/OTV, etc.

The data center L2 domain must also be reachable from an Internet Protocol (IP) network, and therefore typically has a default gateway. When the VLAN spans more than one geographical location, it is desirable that the MAC addresses of the gateway routers learned in each location be the same across all hosts. This is particularly important in the case of virtual server migration across data centers, where a server's Address Resolution Protocol (ARP) cache is frozen, the server is migrated, and then woken up at the new site, where it continues to use the same ARP cache (and therefore the same MAC address) for the default gateway. In such a scenario, a MAC address is used multiple times, and therefore may be present in more than one bridge port (the local bridge port and the port towards the DCI). This condition is normally illegal and the only entry preserved is the last one learned, as traffic is generated from the different sources, the MAC address in question will flap between different ports.

In providing seamless migration of virtual or physical devices among networks of the VLAN, one embodiment uses a same virtual anycast MAC (VMAC) for default gateways in geographically separate data center sites configured with extended networks. Further, one embodiment blocks traffic with the virtual MAC as source MAC at the data center interconnect edge devices of the VLAN, such that the L2 devices on each network will send packets to the gateway router on its local network, rather than across to another network of the VLAN via interconnect edge devices.

At each site, source MAC learning for VMAC should happen only for packets coming from the local default gateway. For example, L2 switches in a data center must MAC learn only ports for VMAC that are towards the local default gateway in that same data center, and not MAC learn ports for VMAC that are towards the local default gateway in another data center, such as communicatively coupled over the Data Center Interconnect (DCI).

One embodiment includes a virtual local area network (VLAN), comprising: a first network including a first gateway router assigned a first Internet Protocol (IP) address and first Medium Access Control (MAC) address for use including forwarding packets received from one or more external networks into the first network; and a second network, communicatively coupled with the first network for exchanging Layer 2 traffic, and including a second gateway router assigned a second IP address and second MAC address for use including forwarding packets received from said one or more external networks into the second network; wherein each of the first and second gateway routers are further assigned a same third IP address and a same third MAC address for use in selectively communicating with devices on their respective first or second network, such that a virtual or physical device migrated from the first network to the second network can use the third IP address as its default IP gateway address and reach the default gateway using packets addressed with a MAC destination address of the third MAC address when it is on the first network and when it is on the second network; wherein the VLAN is configured such that Layer 2 traffic devices in the first network will MAC learn ports for the third MAC that are towards the first gateway router and not towards the second gateway router, and configured such that Layer 2 traffic devices in the second network will MAC learn ports for the third MAC that are towards the second gateway router and not towards the first gateway router.

In one embodiment, packet traffic, addressed with the third MAC address as its source MAC address, originated on the first network or the second network will not be communicated to the other said second or first network. In one embodiment, said configuration of the first gateway router includes sending packets using the third MAC address as the source MAC address of packets sent on the first network for Address Resolution Protocol (ARP) responses for resolving the third IP address or for gratuitous ARP packets advertising the third MAC address on the first network; and wherein said configuration of the second gateway router includes sending packets using the third MAC address as the source MAC address of packets sent on the second network for Address Resolution Protocol (ARP) responses for resolving the third IP address or for gratuitous ARP packets advertising the third MAC address on the second network. In one embodiment, said configuration of the first gateway router includes sending an Address Resolution Protocol (ARP) packet using the first MAC address as the source MAC address of the ARP packet, with the third MAC address in the Sender Hardware Address field of the ARP message within the ARP packet; and wherein said configuration of the second gateway router includes sending a particular Address Resolution Protocol (ARP) packet using the second MAC address as the source MAC address of the particular ARP packet, with the third MAC address in the Sender Hardware Address field of the ARP message within the particular ARP packet. In one embodiment, said configuration of the first gateway router includes sending a plurality of gratuitous Address Resolution Protocol (ARP) packets using the third MAC address as the source MAC address with the third MAC address in the Sender Hardware Address field of the ARP message of each of the gratuitous ARP packets; and wherein said configuration of the second gateway router includes sending a plurality of particular gratuitous ARP packets using the third MAC address as the source MAC address with the third MAC address in the Sender Hardware Address field of the ARP message of each of the particular gratuitous ARP packets.

In one embodiment, said configuration of the first gateway router includes sending an Address Resolution Protocol (ARP) packet using the first MAC address as the source MAC address of the ARP packet, with the third MAC address in the Sender Hardware Address field of the ARP message within the ARP packet; and wherein said configuration of the second gateway router includes sending a particular Address Resolution Protocol (ARP) packet using the second MAC address as the source MAC address of the particular ARP packet, with the third MAC address in the Sender Hardware Address field of the ARP message within the particular ARP packet.

One embodiment includes a virtual local area network (VLAN), comprising: a first network including a first gateway router assigned a first Internet Protocol (IP) address and first Medium Access Control (MAC) address for use including forwarding packets received from one or more external networks into the first network; and a second network, communicatively coupled with the first network for exchanging Layer 2 traffic, and including a second gateway router assigned a second IP address and second MAC address for use including forwarding packets received from said one or more external networks into the second network; wherein each of the first and second gateway routers are further assigned a same third IP address and a same third MAC address for use in selectively communicating with devices on their respective first or second network, such that a virtual or physical device migrated from the first network to the second network can use the third IP address as its default IP gateway address and reach the default gateway using packets addressed with a MAC destination address of the third MAC address when it is on the first network and when it is on the second network; wherein packet traffic, addressed with the third MAC address as its source MAC address, originated on the first network or the second network will not be communicated to the other said second or first network.

In one embodiment, said configuration of the first gateway router includes sending packets using the third MAC address as the source MAC address of packets sent on the first network for Address Resolution Protocol (ARP) responses for resolving the third IP address or for gratuitous ARP packets advertising the third MAC address on the first network; and wherein said configuration of the second gateway router includes sending packets using the third MAC address as the source MAC address of packets sent on the second network for Address Resolution Protocol (ARP) responses for resolving the third IP address or for gratuitous ARP packets advertising the third MAC address on the second network. In one embodiment, said configuration of the first gateway router includes sending an Address Resolution Protocol (ARP) packet using the first MAC address as the source MAC address of the ARP packet, with the third MAC address in the Sender Hardware Address field of the ARP message within the ARP packet; and wherein said configuration of the second gateway router includes sending a particular Address Resolution Protocol (ARP) packet using the second MAC address as the source MAC address of the particular ARP packet, with the third MAC address in the Sender Hardware Address field of the ARP message within the particular ARP packet. In one embodiment, said configuration of the first gateway router includes sending a plurality of gratuitous Address Resolution Protocol (ARP) packets using the third MAC address as the source MAC address with the third MAC address in the Sender Hardware Address field of the ARP message of each of the gratuitous ARP packets; and wherein said configuration of the second gateway router includes sending a plurality of particular gratuitous ARP packets using the third MAC address as the source MAC address with the third MAC address in the Sender Hardware Address field of the ARP message of each of the particular gratuitous ARP packets.

One embodiment includes a network, comprising: a first network; and a second network; wherein the first network, includes: a first gateway router, communicatively coupled to one or more external networks, including being configured with a first Internet Protocol (IP) address and first Medium Access Control (MAC) address for use including forwarding packets received from said one or more external networks into the first network; and a first edge device; and wherein the second network, includes: a second gateway router, communicatively coupled to said one or more external networks, including being configured with a second IP address and second MAC address for use including forwarding packets received from said one or more external networks into the second network; and a second edge device communicatively coupled with the first edge device configured for communicating Layer 2 traffic with the first edge device; wherein the first edge device and the second edge device are configured including for communicating Layer 2 traffic between them; wherein the first gateway router is configured including to send and receive traffic, including using a third IP address and third MAC address, on the first network; and the second gateway router is configured to send and receive traffic, including using the third IP address and third MAC address, on the second network; wherein at least one of the first edge device and the second edge device is configured to filter packet traffic with its source address being the third MAC address from traversing onto the second network from the first network, and onto the first network from the second network.

In one embodiment, said configuration of the first gateway router includes sending packets using the third MAC address as the source MAC address of packets sent on the first network for Address Resolution Protocol (ARP) responses for resolving the third IP address or for gratuitous ARP packets advertising the third MAC address on the first network; and wherein said configuration of the second gateway router includes sending packets using the third MAC address as the source MAC address of packets sent on the second network for Address Resolution Protocol (ARP) responses for resolving the third IP address or for gratuitous ARP packets advertising the third MAC address on the second network. One embodiment includes: one or more virtual or physical devices migrated from the first network to the second network, with each of said one or more virtual or physical devices configured with the third IP address as its default gateway while on both the first and second networks. One embodiment includes: one or more virtual or physical devices migrated from the first network to the second network, with each of said one or more virtual or physical devices configured with the third IP address as its default gateway while on both the first and second networks.

One embodiment performs a method, comprising: wherein the method is performed in network, including: a first network; and a second network; wherein the first network, includes: a first gateway router, communicatively coupled to one or more external networks, including being configured with a first Internet Protocol (IP) address and first Medium Access Control (MAC) address for use including forwarding packets received from said one or more external networks into the first network; and a first edge device; wherein the second network, includes: a second gateway router, communicatively coupled to said one or more external networks, including being configured with a second IP address and second MAC address for use including forwarding packets received from said one or more external networks into the second network; and a second edge device communicatively coupled with the first edge device configured for communicating Layer 2 traffic with the first edge device; wherein the first edge device and the second edge device are configured including for communicating Layer 2 traffic between them; and wherein the method comprises performing operations, with said operations including: operating a virtual or physical device on the first network, with the default gateway of said virtual or physical device being with the third IP address, with said operating including communicating with a remote device through the first gateway router and said one or more external networks; migrating said virtual or physical device from the first network to the second network, with the default gateway of said virtual or physical device remaining as the third IP address; subsequent to said migration operation and while said virtual or physical device is part of the second network: forwarding one or more packets, received by the first gateway router to said virtual or physical device through the first and second edge devices; and sending one or more outbound packets, by said virtual or physical device to the remote device, using the third MAC address as a MAC destination address, with the second gateway router forwarding said outbound packets towards the remote device.

In one embodiment, said one or more outbound packets, sent by said virtual or physical device to the remote device, using the third MAC address as a MAC destination address are not received by the first gateway router. In one embodiment, the second edge device does not forward said one or more frames including said one or more outbound packets to the first edge device. One embodiment includes: causing, by said virtual or physical device, an Address Resolution Protocol (ARP) packet, requesting a resolution of the third IP address, to be sent on the second network; and in response to the ARP packet, the second gateway router sending an ARP response identifying in the third MAC address as corresponding to the third IP address, with the ARP response using the third MAC address as the source MAC address. In one embodiment, the second network includes a second virtual or physical device; and wherein the method includes: the second virtual or physical device starting a connection, by sending one or more particular packets to the third IP address using the third MAC address as the destination MAC address; and in response to said particular packets, the second gateway router sending one or more response packets using the second MAC address as their source MAC address. In one embodiment, the second network includes a second virtual or physical device; and wherein the method includes: the second virtual or physical device starting a connection, by sending one or more particular packets to the second IP address using the second MAC address as the destination MAC address; and in response to said particular packets, the second gateway router sending one or more response packets using the second MAC address as their source MAC address. In one embodiment, said virtual or physical device is associated with a fourth IP address; and wherein the method includes when said virtual or physical device is located on the second network: sending an Address Resolution Protocol (ARP) packet, by the first gateway router, for resolving the fourth IP address, with the ARP packet using the second MAC address as its source MAC address, and including the fourth IP address in the Sender Hardware Address field of the ARP message within the ARP packet; and the first gateway router receiving an ARP response from said virtual or physical device located on the second network.

Figure 1:
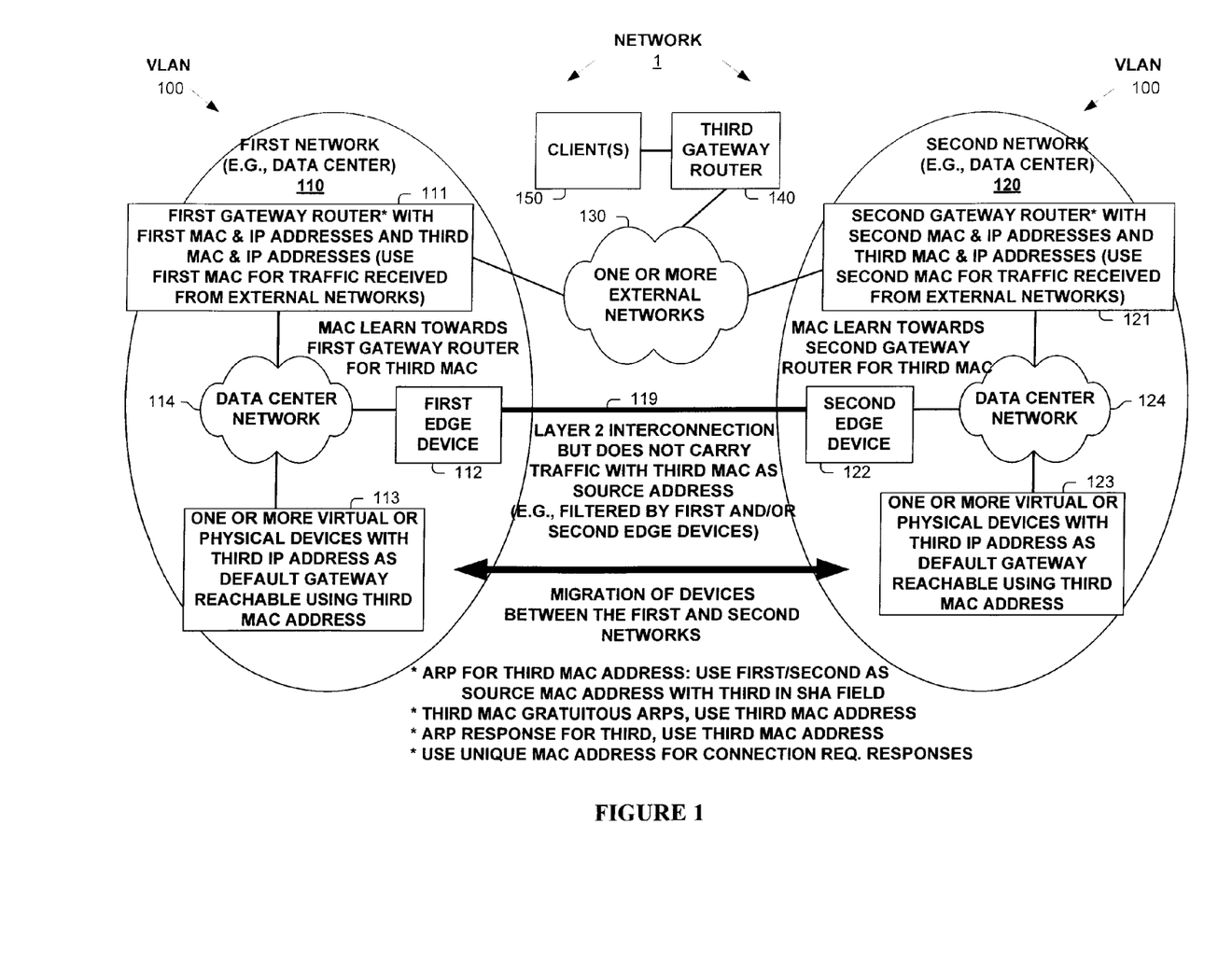
FIG. 1 illustrates a network operating according to one embodiment.

Expressly turning to the figures, FIG. 1 illustrates a network operating according to one embodiment. Note, described herein are two networks of two data centers of a VLAN. As understood by one skilled in the art, the embodiments and ideas presented herein can include more than two networks/data centers using the techniques described herein.

As shown, virtual local area network (VLAN) 100 includes first network (e.g., in a first data center) 110 and second network (e.g., in a second data center) 120, communicatively coupled via Layer 2 interconnection 119. Typically, first network 110 and second network 120 are located in different locations, with VLAN 100 then spanning these multiple locations.

As illustrated, first network 110 includes a first gateway router 111 configured for communicating with devices external to VLAN 100 (e.g., via one or more external networks 130), a data center network 114 for providing communications between networked devices in first network 110; first edge device 112 configured for communicating with one or more remote sites, such as via LAN extension 119 (e.g., Data Center Interconnect (DCI) technology, such as, but not limited to VPLS/VPLSoGRE/OTV, etc.), and one or more virtual or physical devices 113 (e.g., servers for clients 150). Note, first gateway router 111 and second gateway router 121 could be multiple physical devices, such as those configured using Hot Standby Routing Protocol (HSRP).

As shown, second network 120 includes a second gateway router 121 configured for communicating with devices external to VLAN 100 (e.g., via one or more external networks 130), a data center network 124 for providing communications between networked devices in second network 120; second edge device 122 configured for communicating with one or more remote sites, such as via LAN extension 119 (e.g., Data Center Interconnect (DCI) technology, such as, but not limited to VPLS/VPLSoGRE/OTV, etc.), and one or more virtual or physical devices 123 (e.g., servers for clients 150).

Network 1 also includes one or more external networks 130, a third gateway router 140, and one or more clients 150.

Data centers, such as illustrated data centers/networks 110 and 120, provide data services to clients 150, with these data services provided by one or more virtual or physical devices 113. When a physical device becomes overloaded, virtual devices are often migrated to other physical devices so that they can continue operations. It is possible to stop such a virtual device, move it from one physical device 113 or 123 to another physical device 113 or 123, possibly in a different data center/network 110, 120. If the virtual device is simply stopped/frozen/slept, then the default IP gateway and the cached MAC address for reaching the default IP gateway will remain the same. This will work: however, if the virtual device 113, 123 is moved to a different data center, all traffic between the client(s) 150 and the migrated virtual device 113, 123 will traverse 119. It is typically desirable that one or more virtual or physical devices 123 send data to client(s) 150 via second gateway router 121, rather than via Layer 2 interconnect 119 and first gateway router 111. Thus, VLAN 100 is configured in certain ways to provide such seamless migration of virtual devices 113, 123 from one data center/network 110, 120 to another data center/network 120, 110. Note, it is possible to move physical devices 113, 123 between data center/networks 110 and 120, with the techniques being described herein applicable, even though they are described herein referring to "virtual" devices.

In one embodiment, VLAN 100 is configured as follows. First gateway router 111 uses a first IP address, and a first MAC address (e.g., its physical, original MAC address), and a third IP address and third MAC address (sometimes referred to as virtual IP and MAC addresses). Second gateway router 121 uses a second IP address and a second MAC address (e.g., its physical, original MAC address), and the same third IP address and third MAC address as used by first gateway router 111. Network devices within first network 110 and second network 120 MAC learn MAC addresses for the third MAC address only towards their respective gateway router 111, 121.

Virtual or physical devices 113, 123 that are possibly going to be migrated use the third IP address as their default gateway address which is associated with the third MAC address. Therefore, when a virtual or physical device 113, 123 is migrated to a different network 120, 110, then the cached MAC address (third MAC address) for the default IP gateway (third IP address) will cause traffic to be sent out the first gateway router 111 or second gateway router 121 of the current network 110 or 120. Typically, this migration can therefore be done without rebooting nor flushing the MAC cache of the migrated virtual or physical device 113, 123.

In one embodiment, in order to help with the appropriate MAC learning, packets having a source MAC address of the third MAC address are not communicated between networks 110 and 120 via layer 2 interconnection 119. In one embodiment, this is accomplished by filtering of packets having a source MAC address of the third MAC address by first edge device 112 and/or second edge device 122. One embodiment filters these packets by first edge device 112 and second edge device 122 so that they do not traverse layer 2 interconnection 119.

In one embodiment, in order to help with the appropriate MAC learning, each of the first gateway router 111 and second gateway router 121 is configured for sending packets using the third MAC address as the source MAC address of packets sent on its corresponding network 110, 120 for Address Resolution Protocol (ARP) responses for resolving the third IP address or for gratuitous ARP packets advertising the third MAC address on its corresponding network 110, 120.

In one embodiment, in order to help with the appropriate MAC learning, each of the first gateway router 111 and second gateway router 121 is configured for sending an ARP packet using their unique (i.e., first or second) MAC address as the source MAC address of the ARP packet, with the third MAC address in the Sender Hardware Address field of the ARP message within the ARP packet.

In one embodiment, in order to help with the appropriate MAC learning especially in the case when the third MAC address is not used often (e.g., sent on a network less than the timeout length of the MAC cache of a virtual or physical device 113, 123), each of the first gateway router 111 and second gateway router 121 is configured for sending gratuitous ARP packets using the third MAC address as the source MAC address with the third MAC address in the Sender Hardware Address field of the ARP message of each of the gratuitous ARP packets.

In one embodiment, in order to help with the appropriate MAC learning, virtual or physical devices 113, 123, when starting a connection to the default gateway router (111 or 121), will use the third MAC address as the destination MAC address, and the corresponding default gateway router (111 or 121) will respond using its corresponding unique first or second MAC address. In one embodiment, virtual or physical devices 113, 123, when starting a connection to the default gateway router (111 or 121) using the unique first or second MAC address, the corresponding default gateway router (111 or 121) will respond using its corresponding unique first or second MAC address.

Figure 2:
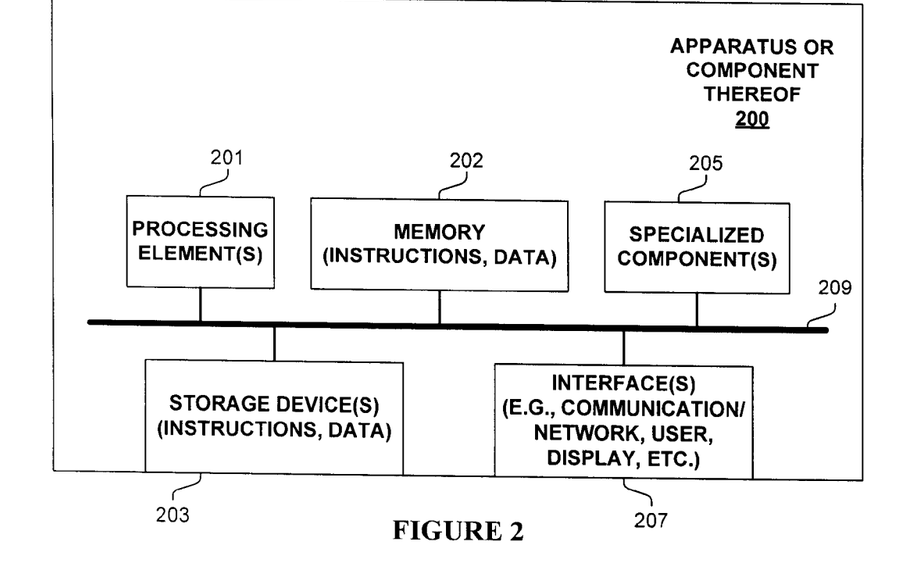
FIG. 2 illustrates an apparatus or component used in one embodiment.

FIG. 2 is block diagram of an apparatus or component 200 used in one embodiment associated with multiple network architecture providing for migration of devices. In one embodiment, apparatus or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g. optimized hardware such as for performing operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, one or more routers or devices illustrated in FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
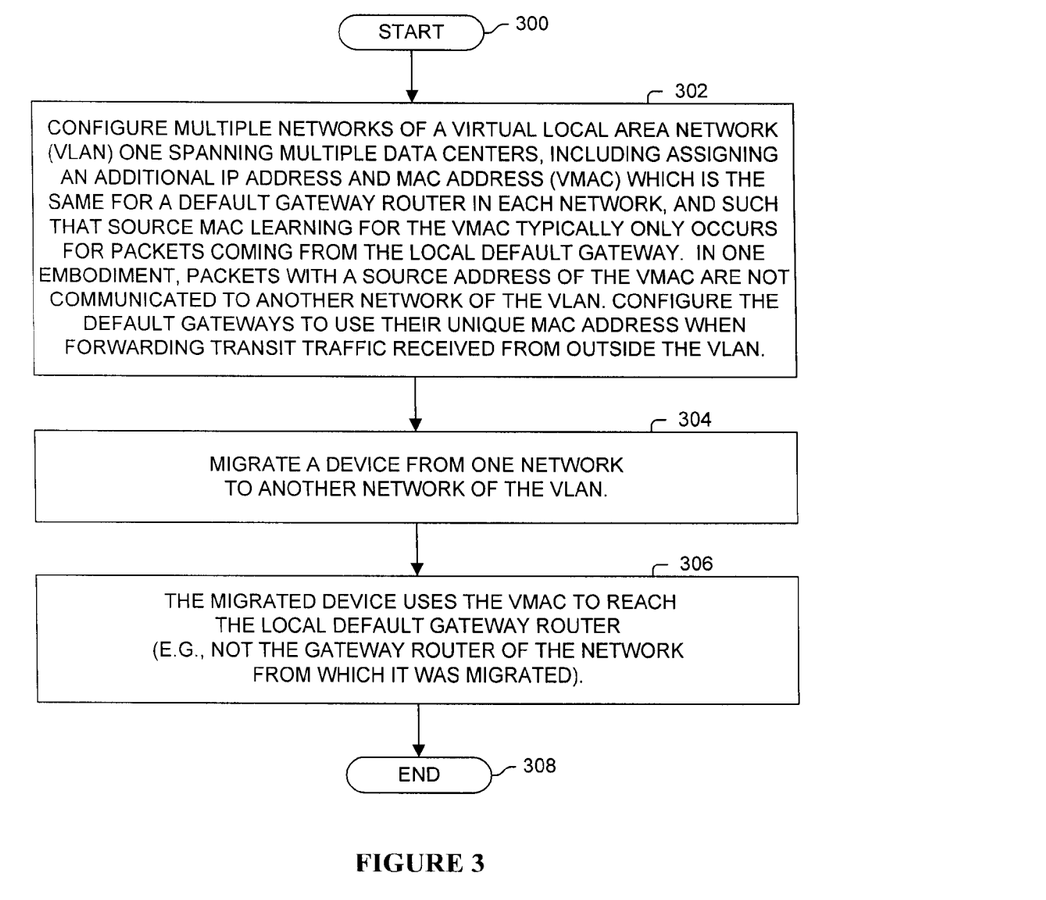
FIG. 3 illustrates a process performed in one embodiment.

FIG. 3 illustrates a process performed in one embodiment. Processing begins with process block 300. In process block 302, multiple networks of a virtual local area network (VLAN) one spanning multiple data centers are configured, which includes assigning an additional IP address and MAC address (VMAC) which is the same for a default gateway router in each network of the VLAN. This network configuration is such that source MAC learning for the VMAC typically only occurs for packets coming from the local default gateway. In one embodiment, packets with a source address of the VMAC are not communicated to another network of the VLAN. Also, the default gateway in each of the networks is configured to use their unique, physical MAC address when forwarding transit traffic received from outside the VLAN. Next, in process block 304, a virtual or physical device is migrated from one network to another network within the VLAN. In process block 306, the migrated device using the VMAC to reach the local default gateway (i.e., not the gateway router of the network from which the device was migrated). Processing of the flow diagram of FIG. 3 is complete as indicated by process block 308.

Figure 4A:
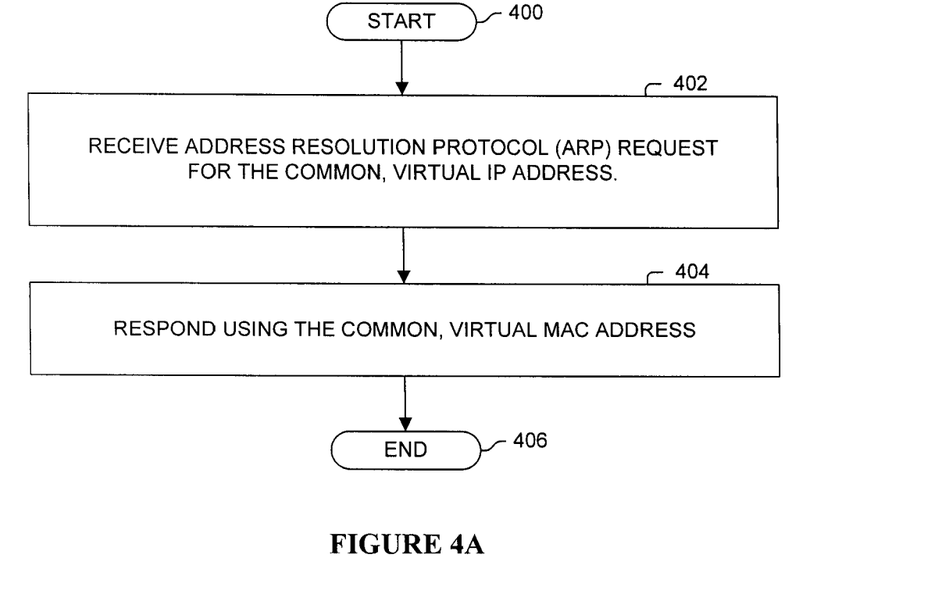
FIG. 4A illustrates a process performed in one embodiment.

FIG. 4A illustrates a process performed in one embodiment. Processing begins with process block 400. In process block 402, an Address Resolution Protocol (ARP) request for the common, virtual IP address is received by a default gateway router. In process block 404, the default gateway router responds using its assigned common, virtual MAC address (VMAC). Processing of the flow diagram of FIG. 4A is complete as indicated by process block 406.

Figure 4B:
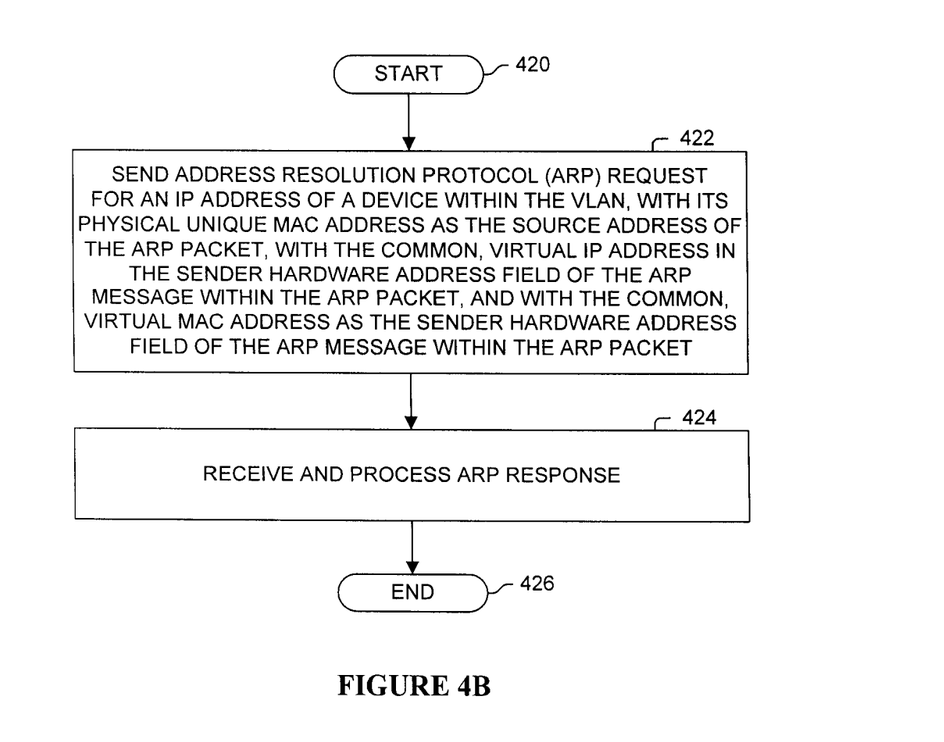
FIG. 4B illustrates a process performed in one embodiment.

FIG. 4B illustrates a process performed in one embodiment. Processing begins with process block 420. In process block 422, a default gateway router sends an Address Resolution Protocol (ARP) request for an IP address of a device within the VLAN using its unique, physical MAC address as the MAC source address of the packet, with the common, virtual MAC address (VMAC) in the Sender Hardware Field of the ARP message within the ARP packet. In process block 424, the ARP response is received and processed. Processing of the flow diagram of FIG. 4B is complete as indicated by process block 426.

Figure 4C:
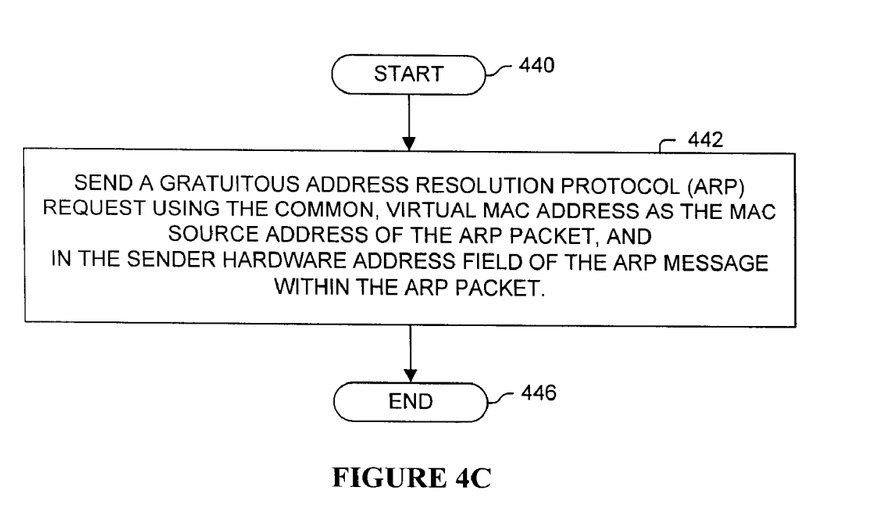
FIG. 4C illustrates a process performed in one embodiment.

FIG. 4C illustrates a process performed in one embodiment. Processing begins with process block 440. In process block 442, a default gateway router sends a gratuitous ARP request using the common, virtual MAC address as the MAC source address of the ARP packet, and in the Sender Hardware Field of the ARP message within the ARP packet. Processing of the flow diagram of FIG. 4C is complete as indicated by process block 446.

Figure 5A:
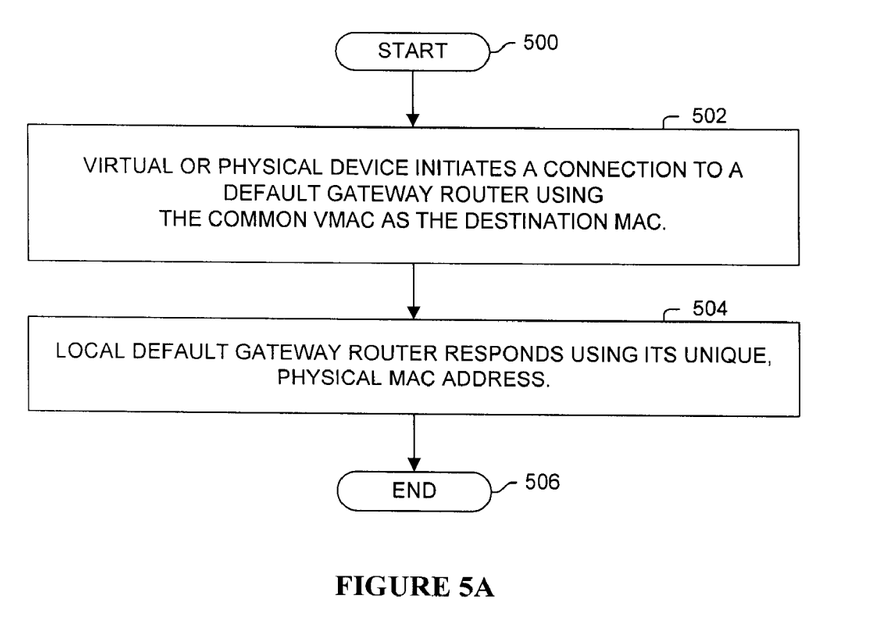
FIG. 5A illustrates a process performed in one embodiment.

FIG. 5A illustrates a process performed in one embodiment. Processing begins with process block 500. In process block 502, a virtual or physical device of the VLAN initiates a connection to a default gateway router using the common VMAC as the destination MAC. In process block 504, the local default gateway router responds using its unique, physical MAC address. Processing of the flow diagram of FIG. 5A is complete as indicated by process block 506.

Figure 5B:
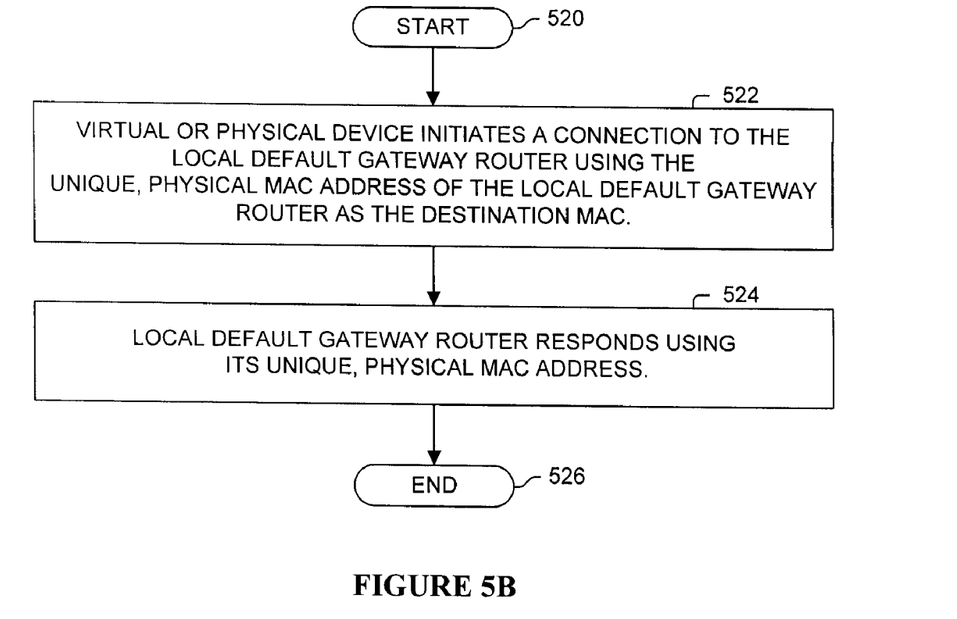
FIG. 5B illustrates a process performed in one embodiment.

FIG. 5B illustrates a process performed in one embodiment. Processing begins with process block 520. In process block 522, a virtual or physical device of the VLAN initiates a connection to a default gateway router using the unique, physical MAC address of the local default gateway router as the destination MAC. In process block 524, the local default gateway router responds using its unique, physical MAC address. Processing of the flow diagram of FIG. 5B is complete as indicated by process block 526.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A virtual local area network (VLAN), comprising:
 a first network including a first gateway router assigned a first Internet Protocol (IP) address and first Medium Access Control (MAC) address for use including forwarding packets received from one or more external networks into the first network; and
 a second network, communicatively coupled with the first network for exchanging Layer 2 traffic, and including a second gateway router assigned a second IP address and second MAC address for use including forwarding packets received from said one or more external networks into the second network;
 wherein each of the first and second gateway routers are further assigned a same third IP address and a same third MAC address for use in selectively communicating with devices on their respective first or second network, such that a virtual or physical device migrated from the first network to the second network can use the third IP address as its default IP gateway address and reach the default gateway using packets addressed with a MAC destination address of the third MAC address when it is on the first network and when it is on the second network; wherein the VLAN is configured such that Layer 2 traffic devices in the first network will MAC learn ports for the third MAC that are towards the first gateway router and not towards the second gateway router, and configured such that Layer 2 traffic devices in the second network will MAC learn ports for the third MAC that are towards the second gateway router and not towards the first gateway router.

2. The VLAN of claim 1, wherein packet traffic, addressed with the third MAC address as its source MAC address, originated on the first network or the second network will not be communicated to the other said second or first network.

3. The VLAN of claim 1, wherein said configuration of the first gateway router includes sending packets using the third MAC address as the source MAC address of packets sent on the first network for Address Resolution Protocol (ARP) responses for resolving the third IP address or for gratuitous ARP packets advertising the third MAC address on the first network; and wherein said configuration of the second gateway router includes sending packets using the third MAC address as the source MAC address of packets sent on the second network for Address Resolution Protocol (ARP) responses for resolving the third IP address or for gratuitous ARP packets advertising the third MAC address on the second network.

4. The VLAN of claim 3, wherein said configuration of the first gateway router includes sending an Address Resolution Protocol (ARP) packet using the first MAC address as the source MAC address of the ARP packet, with the third MAC address in the Sender Hardware Address field of the ARP message within the ARP packet; and wherein said configuration of the second gateway router includes sending a particular Address Resolution Protocol (ARP) packet using the second MAC address as the source MAC address of the particular ARP packet, with the third MAC address in the Sender Hardware Address field of the ARP message within the particular ARP packet.

5. The VLAN of claim 4, wherein said configuration of the first gateway router includes sending a plurality of gratuitous Address Resolution Protocol (ARP) packets using the third MAC address as the source MAC address with the third MAC address in the Sender Hardware Address field of the ARP message of each of the gratuitous ARP packets; and wherein said configuration of the second gateway router includes sending a plurality of particular gratuitous ARP packets using the third MAC address as the source MAC address with the third MAC address in the Sender Hardware Address field of the ARP message of each of the particular gratuitous ARP packets.

6. The VLAN of claim 1, wherein said configuration of the first gateway router includes sending an Address Resolution Protocol (ARP) packet using the first MAC address as the source MAC address of the ARP packet, with the third MAC address in the Sender Hardware Address field of the ARP message within the ARP packet; and wherein said configuration of the second gateway router includes sending a particular Address Resolution Protocol (ARP) packet using the second MAC address as the source MAC address of the particular ARP packet, with the third MAC address in the Sender Hardware Address field of the ARP message within the particular ARP packet.

7. A virtual local area network (VLAN), comprising:
a first network including a first gateway router assigned a first Internet Protocol (IP) address and first Medium Access Control (MAC) address for use including forwarding packets received from one or more external networks into the first network; and
a second network, communicatively coupled with the first network for exchanging Layer 2 traffic, and including a second gateway router assigned a second IP address and second MAC address for use including forwarding packets received from said one or more external networks into the second network;
wherein each of the first and second gateway routers are further assigned a same third IP address and a same third MAC address for use in selectively communicating with devices on their respective first or second network, such that a virtual or physical device migrated from the first network to the second network can use the third IP address as its default IP gateway address and reach the default gateway using packets addressed with a MAC destination address of the third MAC address when it is on the first network and when it is on the second network; wherein packet traffic, addressed with the third MAC address as its source MAC address, originated on the first network or the second network will not be communicated to the other said second or first network.

8. The VLAN of claim 7, wherein said configuration of the first gateway router includes sending packets using the third MAC address as the source MAC address of packets sent on the first network for Address Resolution Protocol (ARP) responses for resolving the third IP address or for gratuitous ARP packets advertising the third MAC address on the first network; and wherein said configuration of the second gateway router includes sending packets using the third MAC address as the source MAC address of packets sent on the second network for Address Resolution Protocol (ARP) responses for resolving the third IP address or for gratuitous ARP packets advertising the third MAC address on the second network.

9. The VLAN of claim 8, wherein said configuration of the first gateway router includes sending an Address Resolution Protocol (ARP) packet using the first MAC address as the source MAC address of the ARP packet, with the third MAC address in the Sender Hardware Address field of the ARP message within the ARP packet; and wherein said configuration of the second gateway router includes sending a particular Address Resolution Protocol (ARP) packet using the second MAC address as the source MAC address of the particular ARP packet, with the third MAC address in the Sender Hardware Address field of the ARP message within the particular ARP packet.

10. The VLAN of claim 7, wherein said configuration of the first gateway router includes sending a plurality of gratuitous Address Resolution Protocol (ARP) packets using the third MAC address as the source MAC address with the third MAC address in the Sender Hardware Address field of the ARP message of each of the gratuitous ARP packets; and wherein said configuration of the second gateway router includes sending a plurality of particular gratuitous ARP packets using the third MAC address as the source MAC address with the third MAC address in the Sender Hardware Address field of the ARP message of each of the particular gratuitous ARP packets.

11. A network, comprising:
a first network; and
a second network;
wherein the first network, includes:
a first gateway router, communicatively coupled to one or more external networks, including being configured with a first Internet Protocol (IP) address and first Medium Access Control (MAC) address for use including forwarding packets received from said one or more external networks into the first network; and
a first edge device; and
wherein the second network, includes:
a second gateway router, communicatively coupled to said one or more external networks, including being configured with a second IP address and second MAC address for use including forwarding packets received from said one or more external networks into the second network; and
a second edge device communicatively coupled with the first edge device configured for communicating Layer 2 traffic with the first edge device;
wherein the first edge device and the second edge device are configured including for communicating Layer 2 traffic between them;
wherein the first gateway router is configured including to send and receive traffic, including using a third IP address and third MAC address, on the first network; and the second gateway router is configured to send and receive traffic, including using the third IP address and third MAC address, on the second network;
wherein at least one of the first edge device and the second edge device is configured to filter packet traffic with its source address being the third MAC address from traversing onto the second network from the first network, and onto the first network from the second network.

12. The network of claim 11, wherein said configuration of the first gateway router includes sending packets using the third MAC address as the source MAC address of packets sent on the first network for Address Resolution Protocol (ARP) responses for resolving the third IP address or for gratuitous ARP packets advertising the third MAC address on the first network; and wherein said configuration of the second gateway router includes sending packets using the third MAC address as the source MAC address of packets sent on the second network for Address Resolution Protocol (ARP) responses for resolving the third IP address or for gratuitous ARP packets advertising the third MAC address on the second network.

13. The network of claim 12, including one or more virtual or physical devices migrated from the first network to the second network, with each of said one or more virtual or physical devices configured with the third IP address as its default gateway while on both the first and second networks.

14. The network of claim 11, including one or more virtual or physical devices migrated from the first network to the second network, with each of said one or more virtual or physical devices configured with the third IP address as its default gateway while on both the first and second networks.

15. A method, comprising:
wherein the method is performed in a network, including:
a first network;
and a second network; wherein the first network, includes:
a first gateway router, communicatively coupled to one or more external networks, including being configured with a first Internet Protocol (IP) address and first Medium Access Control (MAC) address for use including forwarding packets received from said one or more external networks into the first network; and a first edge device; wherein the second network, includes: a second gateway router, communicatively coupled to said one or more external networks, including being configured with a second IP address and second MAC address for use including forwarding packets received from said one or more external networks into the second network; and a second edge device communicatively coupled with the first edge device configured for communicating Layer 2 traffic with the first edge device; wherein the first edge device and the second edge device are configured including for communicating Layer 2 traffic between them; and wherein the method comprises performing operations, with said operations including:
operating a virtual or physical device on the first network, with the a default gateway of said virtual or physical device being with a third IP address, with said operating including communicating with a remote device through the first gateway router and said one or more external networks;
migrating said virtual or physical device from the first network to the second network, with the default gateway of said virtual or physical device remaining as the third IP address;
subsequent to said migration operation and while said virtual or physical device is part of the second network: forwarding one or more packets, received by the first gateway router to said virtual or physical device through the first and second edge devices; and sending one or more outbound packets, by said virtual or physical device to the remote device, using a third MAC address as a MAC destination address, with the second gateway router forwarding said outbound packets towards the remote device.

16. The method of claim 15, wherein said one or more outbound packets, sent by said virtual or physical device to the remote device, using the third MAC address as a MAC destination address are not received by the first gateway router.

17. The method of claim 16, wherein the second edge device does not forward said one or more frames including said one or more outbound packets to the first edge device.

18. The method of claim 15, comprising: causing, by said virtual or physical device, an Address Resolution Protocol (ARP) packet, requesting a resolution of the third IP address, to be sent on the second network; and in response to the ARP packet, the second gateway router sending an ARP response identifying in the third MAC address as corresponding to the third IP address, with the ARP response using the third MAC address as the source MAC address.

19. The method of claim 15, wherein the second network includes a second virtual or physical device; and wherein the method includes: the second virtual or physical device starting a connection, by sending one or more particular packets to the third IP address using the third MAC address as the destination MAC address; and in response to said particular packets, the second gateway router sending one or more response packets using the second MAC address as their source MAC address.

20. The method of claim 15, wherein the second network includes a second virtual or physical device; and wherein the method includes: the second virtual or physical device starting a connection, by sending one or more particular packets to the second IP address using the second MAC address as the destination MAC address; and in response to said particular packets, the second gateway router sending one or more response packets using the second MAC address as their source MAC address.

21. The method of claim 15, wherein said virtual or physical device is associated with a fourth IP address; and wherein the method includes when said virtual or physical device is located on the second network: sending an Address Resolution Protocol (ARP) packet, by the first gateway router, for resolving the fourth IP address, with the ARP packet using the second MAC address as its source MAC address, and including the fourth IP address in the Sender Hardware Address field of the ARP message within the ARP packet;
and the first gateway router receiving an ARP response from said virtual or physical device located on the second network.

* * * * *

UNITED STATES PATENT AND TRADEMARK OFFICE
CERTIFICATE OF CORRECTION

PATENT NO. : 8,363,666 B2
APPLICATION NO. : 12/754609
DATED : January 29, 2013
INVENTOR(S) : Donthamsetty et al.

It is certified that error appears in the above-identified patent and that said Letters Patent is hereby corrected as shown below:

In the Specifications

Col. 4, line 3, replace "interconnectedge" with -- interconnect edge --

Col. 4, line 6, replace "interconnectedge" with -- interconnect edge --

Col. 8, line 61, replace "work: however," with -- work; however, --

In the Claims

Col. 15, Claim 15, line 25, replace "with the a" with -- with a --

Signed and Sealed this
Seventh Day of May, 2013

Teresa Stanek Rea
*Acting Director of the United States Patent and Trademark Office*